United States Patent [19]
Matsuura et al.

[11] Patent Number: 5,317,517
[45] Date of Patent: May 31, 1994

[54] DIGITIZING METHOD

[75] Inventors: Hitoshi Matsuura, Hachioji; Hitoshi Aramaki, Hino; Osamu Nakajima, Yamanashi, all of Japan

[73] Assignee: Fanuc Ltd, Minamitsuru, Japan

[21] Appl. No.: 94,914

[22] Filed: Jul. 22, 1993

Related U.S. Application Data

[63] Continuation of Ser. No. 571,645, filed as PCT/JP90/00055, Jan. 17, 1990, abandoned.

[30] Foreign Application Priority Data

Feb. 3, 1989 [JP] Japan ................... 1-26437

[51] Int. Cl.$^5$ .................. G06F 15/46; G05B 19/18
[52] U.S. Cl. ................... 364/474.03; 364/474.37; 318/578
[58] Field of Search ............ 318/560, 561, 568.16, 318/569, 571, 578; 364/474.03, 474.37

[56]     References Cited
       U.S. PATENT DOCUMENTS

| | | | |
|---|---|---|---|
| 4,688,179 | 8/1987 | Yamazaki | 364/474.03 |
| 4,702,652 | 10/1987 | Rokksku et al. | 364/474.03 |
| 4,703,239 | 10/1987 | Yamazaki | 364/474.03 |
| 4,719,578 | 1/1988 | Okitomo et al. | 364/474.03 |
| 4,746,251 | 5/1988 | Yoshikawa et al. | 364/474.03 |
| 4,851,750 | 7/1989 | Yamazaki | 318/561 |
| 4,999,555 | 3/1991 | Yamazaki et al. | 364/474.03 |

Primary Examiner—Jerry Smith
Assistant Examiner—Thomas E. Brown
Attorney, Agent, or Firm—Staas & Halsey

[57]     ABSTRACT

Disclosed is a digitizing method of sensing an amount of displacement of each axis applied to a stylus by a tracer head, profiling a model surface while controlling the stylus in such a manner that the amount of displacement is made equal to a reference amount of displacement, sequentially fetching positional data by a predetermined method, and outputting NC data, wherein a difference between the amount of displacement and the reference amount of displacement is monitored, and the difference is added to the positional data and a specific positional data obtained when the difference exceeds a predetermined value is output. Although the amount of displacement of each axis is controlled to be equal to the reference amount of displacement when a gently inclined configuration is profiled, at the moment when a corner is reached, a phenomenon that the stylus is spaced apart from a model arises so that the difference between the amount of displacement and the reference amount of displacement is increased. This change is sensed and regarded to exhibit the corner, and thus the difference is added to the output point obtained by a usual digitizing and the positional data at a point is output.

3 Claims, 5 Drawing Sheets

DIGITIZING METHOD

This application is a continuation of application Ser. No. 07/571,645, filed as PCT/JP90/00055, Jan. 17, 1990, now abandoned.

CROSS-REFERENCE TO RELATED APPLICATIONS

This application is related to U.S. application Ser. No. 07/397,460.

BACKGROUND OF THE INVENTION

1. Field of the Invention

The present invention relates to a digitizing method by which positional data are sequentially fetched while profiling the configuration of a model, and more specifically, to a digitizing method capable of creating NC data by which the flagging of a corner is reduced.

2. Description of the Related Art

FIG. 5(a) is a diagram explaining a conventional digitizing method, wherein a stylus 2 is moved along a model 4 and respective points P11, P12, ... are sequentially sampled from a previous output point P10 at predetermined intervals. Therefore, the distance from the middle point of a straight line, connecting the previous output point P10 and a present sampling point, to an intermediate point among the sampling points sampled up to this time is determined, and when this distance exceeds a preset tolerance value, the sampling point is designated as an output point.

In the figure, the distance l 16, which is determined when sampling has been executed up to a sampling point P16, satisfies this condition, and thus P16 is designated as an output point and NC data approximating a straight line between the output points P10 and P16 is output.

Nevertheless, the conventional method has a drawback in that the change of a configuration is determined by the middle point among the sampling points.

FIG. 5(b) is a diagram showing a case in which digitizing is executed by profiling a model 5 having a corner 5a, wherein a stylus 2 is moved along the model 5 and respective points P21, P22, ... are sequentially sampled at predetermined intervals from a previous output point P20.

As can be seen from the figure, the distances determined by the above method with respect to sampling points P21 to P25 located in front of the corner 5a are zero and thus they are not designated as an output point. Instead, a sampling point P26 located after the corner 5a and having a distance l 26 exceeding the tolerance amount is first designated as an output point, and as a result, NC data is created based on the straight line connecting the output points P20 and P26, which causes a flagging of the corner.

SUMMARY OF THE INVENTION

Taking the above into consideration, an object of the present invention is to provide a digitizing method capable of creating NC data by which the flagging of a corner can be reduced.

To solve the above problem, in accordance with the present invention, there is provided a digitizing method including the steps of sensing an amount of displacement of each axis applied to a stylus by a tracer head, profiling a model surface while controlling the stylus in such a manner that the amount of displacement is made equal to a reference amount of displacement, sequentially fetching positional data by a predetermined method, and outputting NC data. The digitizing method further includes the steps of monitoring a difference between the amount of displacement and the reference amount of displacement, adding the difference to the positional data, and outputting a specific positional data obtained when the difference exceeds a predetermined value.

Although the amount of displacement of each axis is made equal to the reference amount of displacement when a gently inclined configuration is profiled, when a corner is reached the stylus 2 is spaced from a model, and accordingly, the difference between the amount of displacement and the reference amount of displacement is increased. This change is sensed and considered to show the corner, and thus the difference is added to the output point obtained by a usual digitizing and the positional data at that time is output.

DESCRIPTION OF THE PREFERRED EMBODIMENTS

An embodiment of the present invention will be described below with reference to the drawings.

Figure 1:
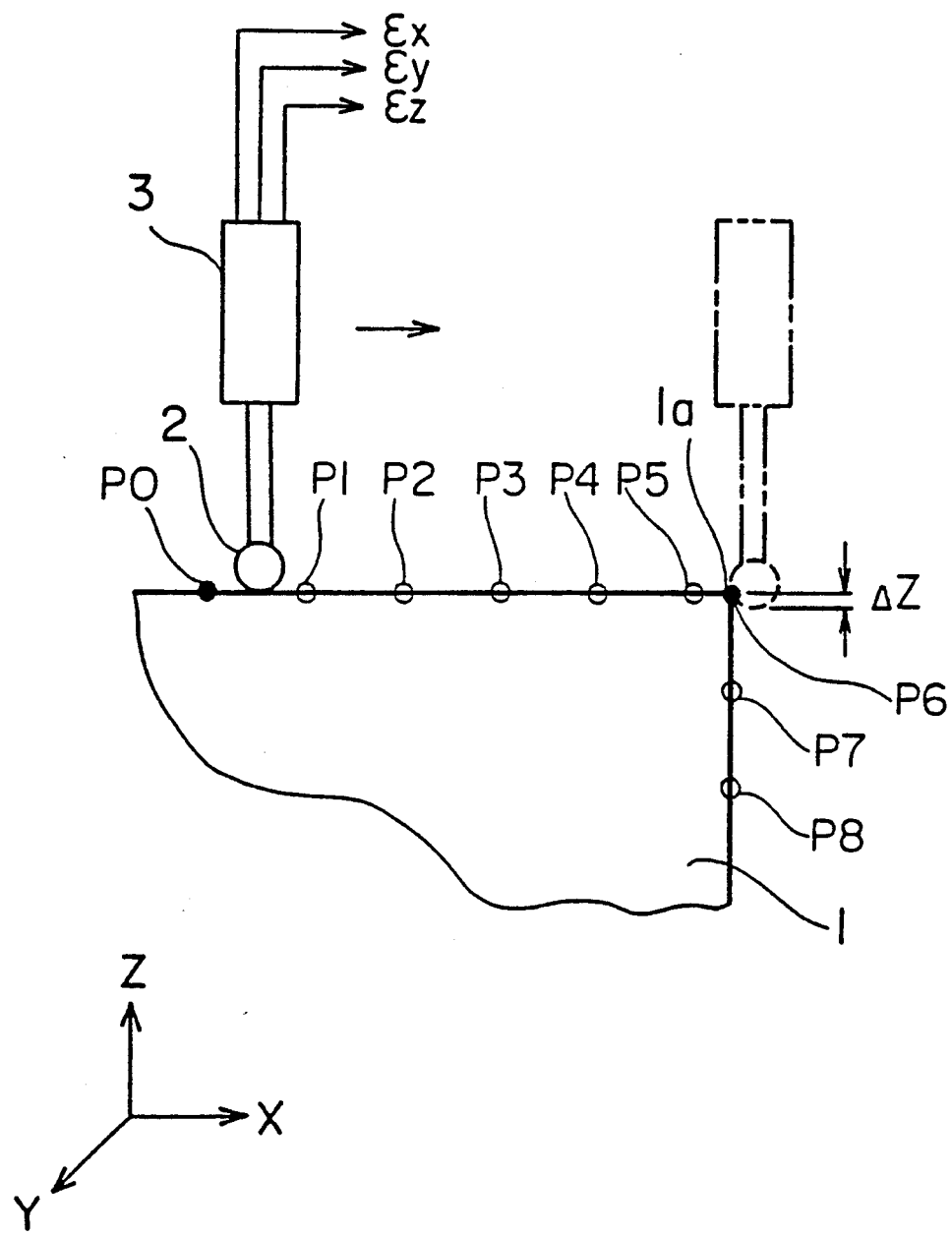
FIG. 1 is a conceptual view of a digitizing method of an embodiment according to the present invention.

FIG. 1 is a conceptual view of a digitizing method of the embodiment according to the present invention. Although profiling is carried out on the X-axis direction in FIG. 1, it can be carried out in any directions in the X-Y plane. In FIG. 1, a stylus 2 is moved in the X-axis direction at a predetermined profiling speed and moved upward and downward also in the Z-axis direction along the configuration of a model 1, and the amounts of displacement of the respective axes $\epsilon x$, $\epsilon y$, and $\epsilon z$ are sensed by a tracer head 3. Namely, respective points P1, P2, ... are sequentially sampled from a previous output point P0 at predetermined intervals while controlling a profiling speed in such a manner that a composite amount of displacement $\epsilon$ (where $\epsilon = \sqrt{\epsilon x^2 + \epsilon y^2 + \epsilon z^2}$) is made equal to a reference amount of displacement $\epsilon 0$ (not shown).

A distance from the middle point of a straight line connecting the previous output point P0 and a present sampling point, to an intermediate point among the sampling points sampled up to this time, is determined, and when this distance exceeds a preset tolerance value, the sampling point is designated as an output point. As apparent from FIG. 1, sampling points P1, P2, P3, P4 and P5 cannot serve as the output point.

When the corner 1a of the model 1 is profiled, the stylus 2 is abruptly moved in the negative direction of the Z-axis by an amount of $\Delta z$, and thus the composite amount of displacement $\epsilon$ is instantaneously made smaller than the reference amount of displacement $\epsilon 0$.

Figure 2:
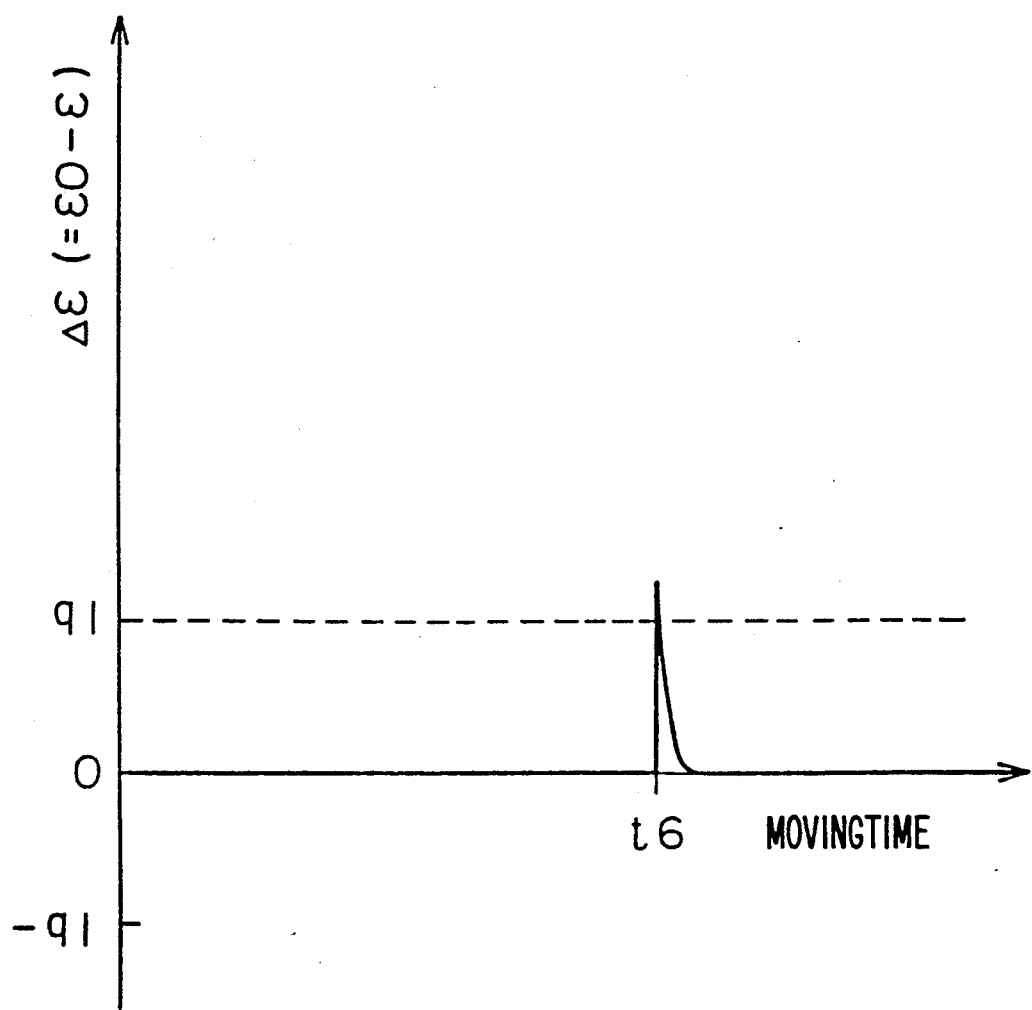
FIG. 2 is a graph showing a difference between a composite amount of displacement and a reference amount of displacement which occurs with an elapse of time.

FIG. 2 shows the change of the composite amount of displacement $\epsilon$, wherein a vertical axis represents a difference $\Delta\epsilon$ between the reference amount of displacement $\epsilon 0$ and the composite amount of displacement $\epsilon$, a horizontal axis represents a time during which the stylus 2 is moved, and t6 corresponds to a timing at which the stylus 2 reaches the corner 1a shown in FIG. 1 The difference $\Delta\epsilon$ is within the range of from q1 to $-$q1 in the gently inclining range of the model 1, but when the stylus 2 reaches the corner 1a, it exceeds q1. This state is sensed and the position of the stylus 2 at the time is fetched and designated as an output point.

Returning to FIG. 1, a point P6 is designated as the output point next to the output point P0, and at the same time, NC data to which a speed command suitable to the corner is added is output. Thereafter, points P7, P8, . . . are sampled from the point P6 at predetermined intervals.

As a result, NC data approximating a straight line between the output points P0 and P6 is obtained and machining in the vicinity of the output point P6 is carried out at a feed speed for the corner, whereby the configuration of the corner 1a can be correctly reproduced.

Figure 3:
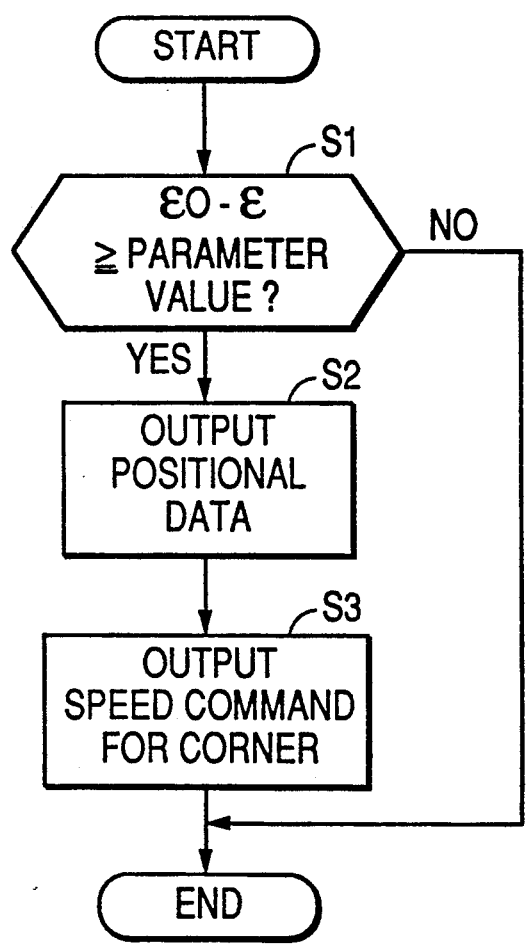
FIG. 3 is a flowchart showing the processes for machining a corner executed by the digitizing method of the embodiment according to the present invention.

FIG. 3 is a flowchart showing the processes for machining the corner when executed by the digitizing method of the embodiment according to the present invention, wherein numerals prefixed with an S indicate the numbers of the steps of these processes.

Whether or not a difference $\Delta\epsilon$ between the reference amount of displacement $\epsilon 0$ and a composite amount of displacement $\epsilon$ exceeds a predetermined threshold value is determined at S1, and when the former exceeds the latter, the process goes to step S2, and when the former does not exceed the latter, digitizing is continuously carried out at predetermined sampling intervals. At step 2, positional data at the point is output, and a speed command for the corner is output at step S3.

Figure 4:
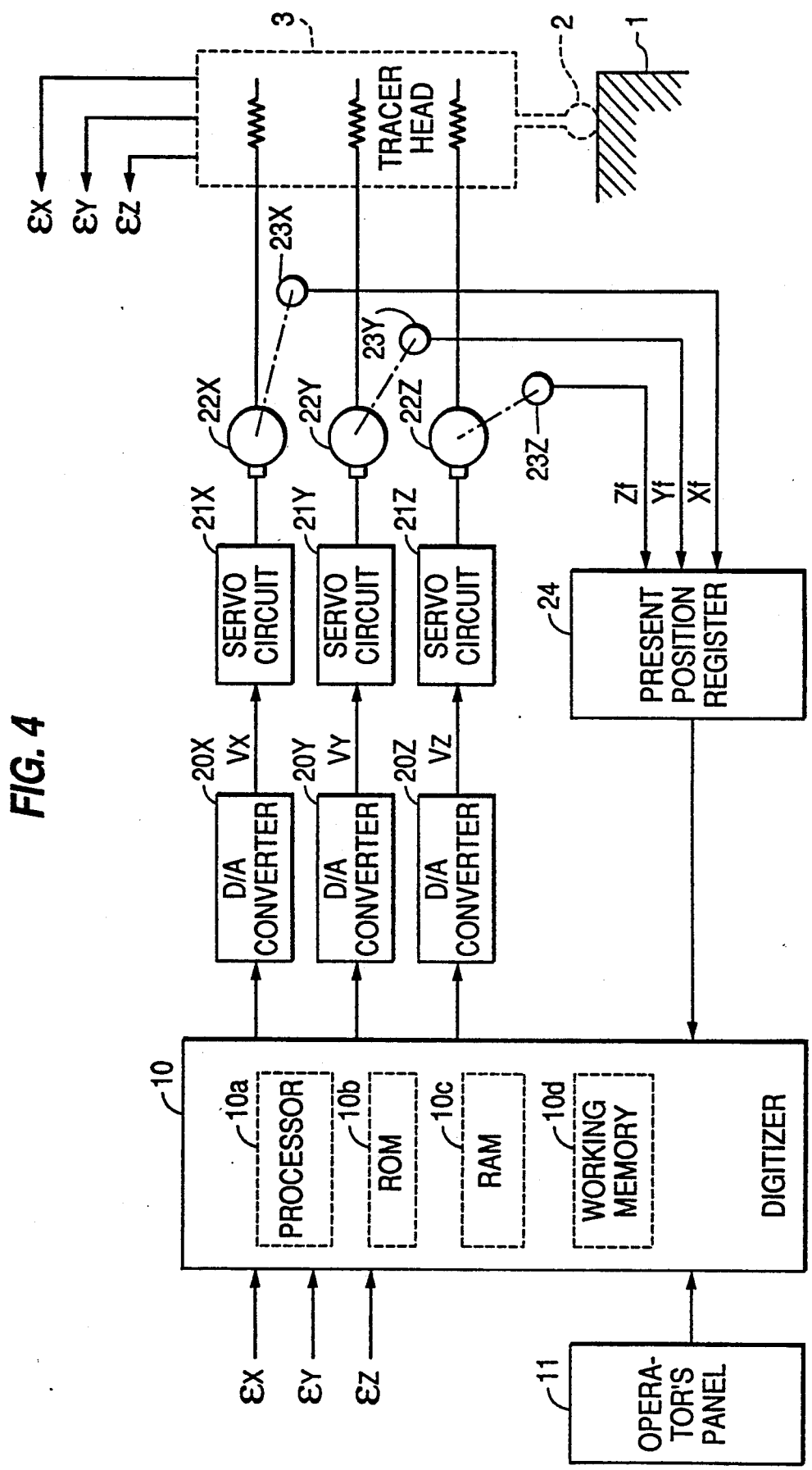
FIG. 4 is a block diagram of hardware embodying the present invention.
Figure 5A:
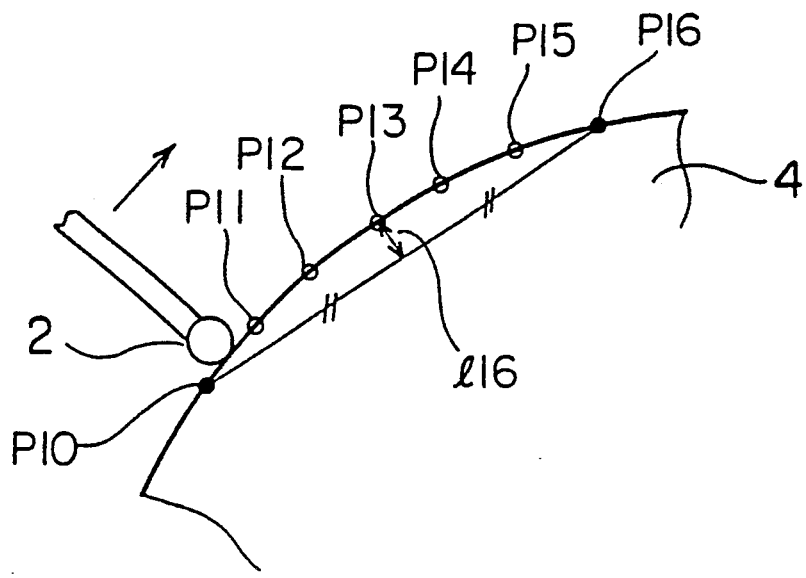
FIG. 5(a) is a diagram explaining a conventional digitizing method.
Figure 5B:
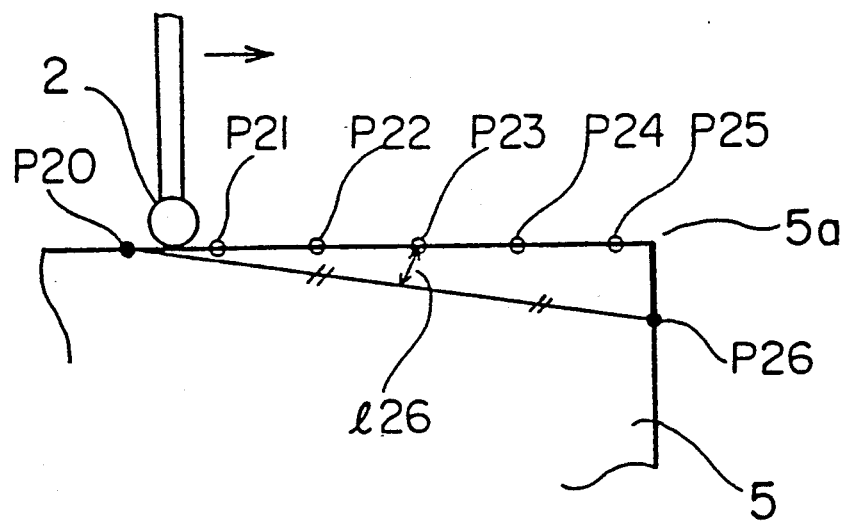
FIG. 5(b) is a diagram explaining a case in which a corner is digitized by the conventional digitizing method.

FIG. 4 is a block diagram of hardware embodying the present invention, wherein a digitizer 10 comprises a processor 10a, a ROM 10b in which a control program is stored, a RAM 10c in which digitized positional data is stored, and a working memory 10d, by which the present position of a tracer head 3 is fetched and digitized while executing a profiling control.

An operator's panel 11 outputs various operation signals and functions to set profiling conditions, a profiling range and method, and the like.

D/A converters 20X, 20Y and 20Z convert digital speed data in the respective axial directions commanded by the digitizer 10 to analog speed signals Vx, Vy and Vz and output the same to servo circuits 21X, 21Y and 21Z. These servo circuits enable servomotors 22X, 22Y and 22Z, which when rotated by a predetermined angle, cause pulse generators 23X, 23Y and 23Z to generate pulse signals Xf, Yf and Zf. A present position register 24 reversibly calculates these respective pulse signals to store the present positions of the respective axes and input same to the digitizer 10.

Note that, although the present embodiment senses the corner by comparing the composite amount of displacement with the reference amount of displacement, the amount of displacement of a particular axis may be compared with the reference amount of displacement.

As described above, according to the present invention, since the difference between the amount of displacement of each axis and the reference amount of displacement is monitored, and when the difference exceeds a predetermined value a corner is be profiled and the positional data at that time is output in addition to the output point obtained by a usual digitizing, NC data capable of correctly reproducing the configuration of the corner can be provided.

Further, a speed command for the corner is added at the same time, and thus a configuration of the corner without flagging can be actually machined.

We claim:

1. A method for generating numerical control data for machining a workpiece based on positional data generated by profiling a model surface with a stylus coupled to a tracer head, the tracer head generating a first signal $\epsilon_x$ representing a displacement of the stylus along an x-axis, a second signal $\epsilon_y$ representing a displacement of the stylus along a y-axis and a third signal $\epsilon_z$ representing a displacement of the stylus along a z-axis, said method comprising the steps:

a) calculating a composite amount of displacement $\epsilon = \sqrt{\epsilon_x^2 \epsilon_y^2} = \epsilon_z^2$;

b) calculating a difference $\Delta\epsilon$ in magnitude between the composite amount of displacement $\epsilon$ and a reference amount of displacement $\epsilon_0$; and c) outputting specific positional data obtained when a magnitude of the difference $\Delta\epsilon$ exceeds a predetermined value.

2. A method as claimed in claim 1, further comprising the step of:

d) generating the numerical control data for machining the workpiece, based on the specific positional data.

3. A method as claimed in claim 1, further comprising the step of:

e) including a speed control command in the numerical control data in correspondence with the specific positional data, for slowing a numerically controlled machine.

* * * * *

UNITED STATES PATENT AND TRADEMARK OFFICE
CERTIFICATE OF CORRECTION

PATENT NO. : 5,317,517  
DATED : May 31, 1994  
INVENTOR(S) : Hitoshi Matsuura et al.

It is certified that error appears in the above-indentified patent and that said Letters Patent is hereby corrected as shown below:

Col. 1, line 31, delete "1 16" and substitute --$\ell 16$--; and line 51, delete "1 26" and substitute --$\ell 26$--.

Col. 2, line 56, delete

"
$$\sqrt{\epsilon x2 + \epsilon y2 + \epsilon z2}$$
"

and substitute

--
$$\sqrt{\epsilon_x^2 + \epsilon_y^2 + \epsilon_z^2}$$
--.

UNITED STATES PATENT AND TRADEMARK OFFICE
CERTIFICATE OF CORRECTION

PATENT NO. : 5,317,517
DATED : May 31, 1994
INVENTOR(S) : hitoshi Matsuura, et al It is certified that error appears in the above-indentified patent and that said Letters Patent is hereby corrected as shown below:

Col. 4, line 48, delete "1" and substitute --2--.

Signed and Sealed this

Twenty-seventh Day of September, 1994

Attest:

BRUCE LEHMAN

*Attesting Officer*    *Commissioner of Patents and Trademarks*